(12) United States Patent
Ramalingam (10) Patent No.: US 9,898,822 B2
(45) Date of Patent: Feb. 20, 2018

(54) METHOD AND SYSTEM FOR RECONSTRUCTING SCENES AS 3D MODELS FROM SEQUENCES OF IMAGES USING CONSTRAINT SATISFACTION

(71) Applicant: Mitsubishi Electric Research Laboratories, Inc., Cambridge, MA (US)

(72) Inventor: Srikumar Ramalingam, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 15/014,171

(22) Filed: Feb. 3, 2016

(65) Prior Publication Data

US 2017/0221211 A1    Aug. 3, 2017

(51) Int. Cl.
*G06K 9/00* (2006.01)
*G06T 7/00* (2017.01)
*G06T 7/55* (2017.01)

(52) U.S. Cl.
CPC .......... *G06T 7/0065* (2013.01); *G06T 7/0022* (2013.01); *G06T 7/55* (2017.01); *G06T 2207/10028* (2013.01); *G06T 2207/30244* (2013.01)

(58) Field of Classification Search
CPC ............... G06T 7/0065; G06T 7/0022; G06T 2207/10028; G06T 2207/30244

USPC .................................................. 382/154, 190
See application file for complete search history.

(56) References Cited

U.S. PATENT DOCUMENTS

| | | | |
|---|---|---|---|
| 7,324,686 B2 * | 1/2008 | Nister | G06T 7/55 345/419 |
| 8,407,550 B2 * | 3/2013 | Yedidia | G06F 7/5057 714/752 |
| 9,183,635 B2 | 11/2015 | Ramalingam et al. | |
| 2011/0041033 A1 | 2/2011 | Yedidia et al. | |

FOREIGN PATENT DOCUMENTS

| | | |
|---|---|---|
| EP | 2015087107 | 6/2015 |
| WO | 0241252 A1 | 5/2002 |

OTHER PUBLICATIONS

S. Gravel and V. Elser. Divide and concur: A general approach to constraint satisfaction. Phys. Rev, 2008.
(Continued)

*Primary Examiner* — Daniel Mariam
(74) *Attorney, Agent, or Firm* — Gene Vinokur; James McAleenan; Hironori Tsukamoto (57) ABSTRACT

A method reconstructs a scene as a three-dimensional (3D) model by first acquiring a sequence of images of the scene with a camera. Then, feature point matches or line matches are extracted from the sequence of images, variables for camera optical centers and 3D points are initialized using random values, and n copies of the variables are made depending on an availability of n constraints. The n copies are projected to satisfy each of the n constraints. Then, the n copies are replaced with averages of the copies and the projecting and the replacing are repeated until convergence to provide the 3D model.

15 Claims, 7 Drawing Sheets

(56) References Cited

OTHER PUBLICATIONS

D. Crandall, A. Owens, N. Snavely, and D. Huttenlocher. Discrete-continuous optimization for large-scale structure from motion. In CVPR, 2011.

Shyjan Maham et al. "Iterative Projective Reconstruction from Multiple Views." Jan. 1, 2000. retrieved from the internet. HTTP://ieeexplore.ieee.org/ielx5/6894/18560/00854872.pdf?tp=&arnumber=854872&isnumber=18560. retrieved Mar. 24, 2017.

Furukawa et al. "Manhatten-world stereo." 2009 IEEE conference on Computer Vision and Pattern Recognition: CVPR 2009, Miami, FL, USA. Jun. 20, 2009. pp. 1422-1429.

Wei Xu et al. "Robust Relative Pose Estimation with Integrated Cheirality Constraint."9th International Conference on Pattern Recognition, 2008. ICPR 2008. Dec. 8-11, 2008. Tampa FL, USA. Dec. 8, 2008. pp. 1-4.

Fred Rothganger et al. 3D Object Modeling and Recognition using Local Affine-Invariant Image Descriptors and Multi View Spatial Constraints. International Journal of Computer Vision, Kluwer Academic Publishers, vol. 66, No. 3, Mar. 1, 2006. pp. 231-259.

J Matas, "Randomized RANSAC with Td,d test," Image and Vision Computing, vol. 22, No. 10. Sep. 1, 2004. pp. 837-842.

Alex Flint et al. "Manhatten Scene Understanding using Monocular, Stereo, and 3D Features," Computer Vision ICCV 2011 IEEE International Conference on. Nov. 6, 2011. pp. 2228-2235.

\* cited by examiner

METHOD AND SYSTEM FOR RECONSTRUCTING SCENES AS 3D MODELS FROM SEQUENCES OF IMAGES USING CONSTRAINT SATISFACTION

FIELD OF THE INVENTION

The invention is generally related to computer vision, and more particularly to reconstructing scenes from sequences of images using constraint satisfaction to determine relative poses and to reconstruct 3D points and 3D lines.

BACKGROUND OF THE INVENTION

In computer vision applications, estimation of geometrical characteristics of scenes and objects, such as relative pose, absolute pose and three-dimensional (3D) models, rely on underlying constraints. For example, graph-rigidity based on inter-point distances can be used for 3D reconstruction. Cheirality is one of the key concepts that enables one to identify a correct reconstruction from ambiguous ones arising from mirror reflection. In simple words, the cheirality constraint enforces that the scene is in front of the camera rather than behind it.

Divide and Concur (D&C) is a constraint satisfaction method based on difference-map (DM) dynamics. The D&C method is closely related to iterative optimization methods. In particular, the D&C method can be characterized as a message-passing method and it is similar to Belief Propagation (BP). The D&C method can be characterized as a special case of an alternating direction method of multipliers (ADMM) method. Furthermore, the D&C method is a generalization of iterative projection methods such as Douglas-Rachford for convex optimization, and Fienup's Hybrid input output (HIO) method for phase retrieval.

Generally, 3D modeling methods use the following steps. First, one estimates the poses of the cameras, and then outliers are removed. To this end, minimal approaches are critical. After obtaining some initial solution for camera poses and 3D points, bundle-adjustment can be applied.

In a 5-point solver, several challenging minimal problems are addressed using algebraic solvers. Algebraic solvers are not guaranteed to solve any polynomial system. For example, certain minimal problems such as 3-view 4-point are notoriously difficult to solve. There are other challenging problems, such as estimating the poses from six line correspondences in three views, and minimal methods for general cameras.

General cameras refer to a broad class of sensors where the projection rays do not necessarily pass through an optical center of the camera. This generality creates greater challenges when one tries to solve minimal problems. For example, the relative pose between two general cameras produces 64 solutions after solving a large polynomial system.

SUMMARY OF THE INVENTION

The embodiments of invention provide a method and system for reconstructing a scene as a three-dimensional (3D) model from a sequence of images using constraint satisfaction to determine relative poses and to reconstruct 3D points and 3D lines. The constraint satisfaction is based on a difference-map (DM) search strategy. The method does not require any initialization and can determine both discrete and continuous variables. Existing approaches require initialization and are usually customized for either discrete or continuous variables, but not both.

The method can be considered as a special case of an alternating direction method of multipliers (ADMM). The embodiments model computer vision problems, such as a line-labeling problem, 3D reconstruction using point or line correspondences for both perspective, and general cameras, line-based 3D reconstruction using geometrical constraints.

In contrast to other methods that use a single image or fewer constraints, the embodiments can concurrently handle all the available constraints and images.

Iterative methods are not new in computer vision. In fact, one of the most applied methods in geometric computer vision is bundle-adjustment. Despite its significant impact on handling city-scale 3D models, local minima are still a serious problem for bundle adjustment.

DETAILED DESCRIPTION OF THE PREFERRED EMBODIMENTS

Figure 1:
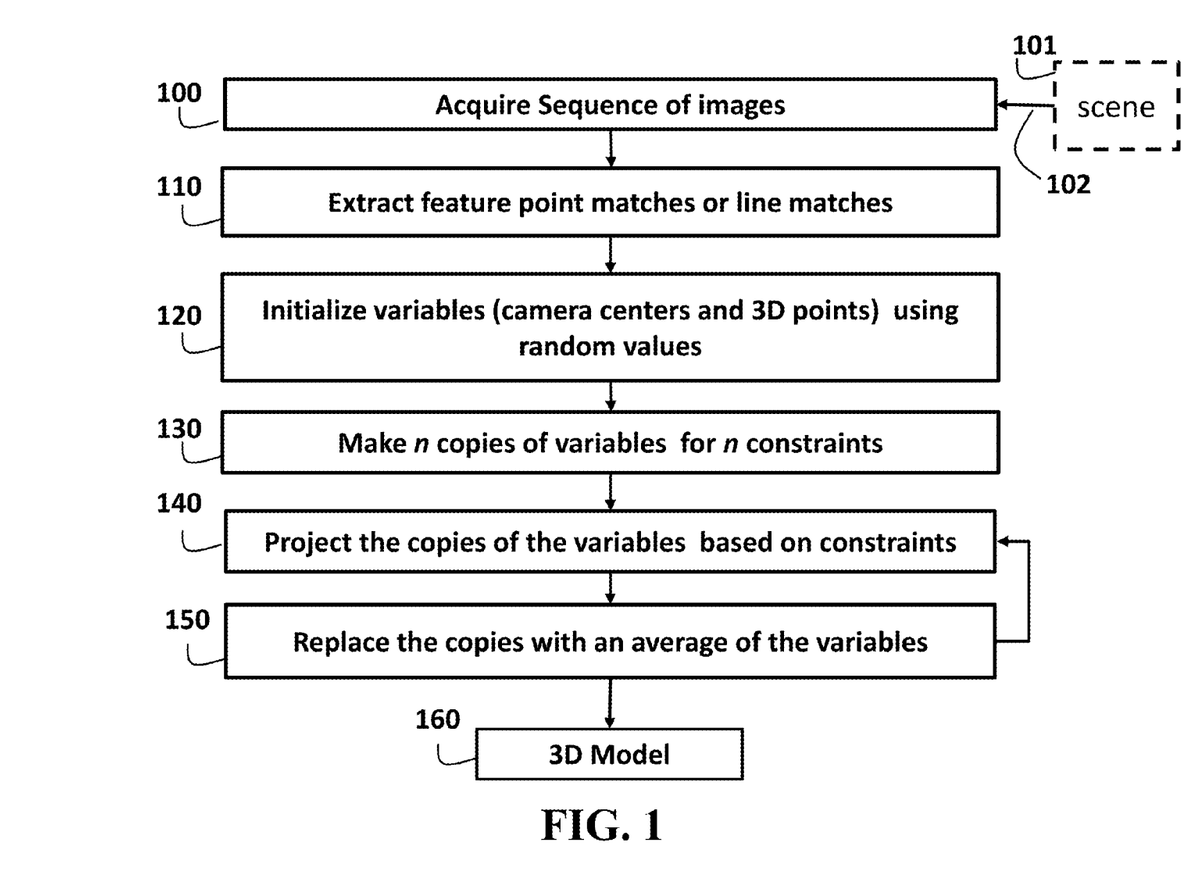
FIG. 1 is a block diagram of a method and system for reconstructing a scene as a three-dimensional (3D) model from a sequence of images according to embodiments of the invention.

As shown in FIG. 1, the embodiments of our invention provide a method and system for reconstructing a scene as a three-dimensional (3D) model from a sequence of images using constraint satisfaction to determine relative poses and the reconstruction of 3D points and lines.

A sequence of images 102 is acquired of a scene 101 with a camera. Feature point matches or line matches are extracted 110 from the sequence of images using, for example, a conventional feature matching procedure, such as a scale-invariant feature transform (SIFT).

Next, variables are initialized 120, e.g., camera optical centers and 3D points, using random values. We make 130 n copies of the variables depending on the availability of n constraints 130. We project 140 the copies to satisfy each of the constraints. The copies of the same variables are forced to agree using a concur constraint by averaging the replicas. We iterate the steps 140 and 150 until convergence. The average values of the variables after convergence provide the 3D model 160.

The embodiments of our invention apply to 3D modeling that uses both discrete and continuous optimization techniques, and Divide and Concur (D&C) for constraint satisfaction. In particular, belief propagation is used for solving rotation matrices, and Levenberg Marquardt iteration is used for continuous optimization.

The embodiments provide solutions for both discrete (line-labeling problem), and continuous optimization (3D modeling). Conventional iterative methods, such as the Douglas-Rachford method, are generally applied on convex problems. The success of difference-map on phase-retrieval problem indicates that these methods can also be useful for non-convex problems.

The Difference-Map Dynamics

In the D&C method, each variable is replicated as many as the number of constraints that uses it. Rather than working directly with the original variables of the constraint satisfaction problem, the DC method tries to determine a setting of the replica values that satisfies all the original constraints, with additional constraints that all values of the replicas of the same variables must be equal. The original ones are called Divide constraints, while the equalities are called Concur constraints. The DC method operates by alternating the Divide and Concur constraints.

The D&C projections are combined according to Difference-Map dynamics. We briefly describe how the difference-map works and how it performs better than a simple alternating projection method. The difference-map overshoots the replicas after satisfying the Divide constraints. Then, the overshoots are subtracted from the replicas. This allows the D&C method to avoid the traps (fixed points that are not solutions to the problem), which causes serious issues for the simple alternating projection method.

Each constraint on a point x, i.e., a vector of variables, can be expressed as a set S and the constraint satisfaction problem is equivalent to finding a point in the set $x' \in S$ such that $p'=\mathrm{argmin}_p |p-p'|$, where $|p-p'|$ is the Euclidean distance. The associated operator $P: x \to x'$, $\{x' \in S\}$ is referred to as the projection. In other words, the projection operator moves the variables by a minimal distance so that the variables satisfy a particular constraint.

Let us consider a set of N constraints, each denoted by a set $S_i$, $i=\{1, 2, \ldots, n\}$. Our goal is to determine a point $\hat{p}$ that lies in the intersection of all these sets. In other words, $\hat{p} \in S_i$, $\forall i=\{1, 2, \ldots, n\}$. We first make n replicas of the variables at a time t as $$y_t = (x^{t:1}, x^{t:2}, \ldots, x^{t:n}). \tag{1}$$

Let us denote the projections for each of these constraints as $P_i$, $i=\{1, \ldots, n\}$. We use $P_D$ and $P_C$ to denote "Divide" and "Concur" projections respectively. The divide projection $P_D$ moves the individual replicas to satisfy each of the individual constraints. In other words, the Divide projection refers to the simultaneous application of each of the individual constraints $P_i$ on each of the individual replicas $x^{t:i}$ as $$P_D(y_t) = (P_1(x^{t:1}), P_2(x^{t:2}), \ldots, P_N(x^{t:n})). \tag{2}$$

After the application of the constraints, we make the replicas agree with each other. This is done by the "Concur" projection $$P_C(P_D(y_t)) = (\bar{x}, \bar{x}, \ldots, \bar{x}). \tag{3}$$

where $$\bar{x} = \frac{\sum_{i=1}^{n} P_i(x^{t:i})}{n}.$$

In the next iteration, we have the following replicas:

$$y_{t+1} = (\bar{x}, \bar{x}, \ldots, \bar{x}). \tag{4}$$

The above method can be written in a single equation:

$$y_{t+1} = P_C(P_D(y_t)). \tag{5}$$

This is generally referred to as alternating projections method. This method can be used in convex problems, whereas in non-convex problems, the method is prone to getting struck in fixed points which do not correspond to the solutions of the problem. We refer to a point y* as a fixed point when $y_{t+1} = y_t = y^*$. The alternating projections method using the DM can handle non-convex constraints in diffraction imaging problems $$y_{t+1} = P_C(y_t^{over}) - (P_D(y_t) - y_t). \tag{6}$$

The above difference-map dynamics is a three-step process:

1. We move the replicas by twice the amount given by the Divide projection. We refer to these as overshoot values $y_t^{over} = y_t + 2(P_D(y_t) - y_t)$.
2. We apply the Concur projection on the overshoot values by $y_t^{conc} = P_C(y_t^{over})$.
3. Then, the overshoot is removed from the concured values to obtain the replicas for the next iteration $y_{t+1} = y_t^{conc} - (P_D(y_t) - y_t)$.

In contrast to the alternating projection method, if a fixed point y* given by $y_{t+1} = y_t = y^*$ is reached by the DM dynamics, then this fixed point corresponds to a solution for the problem. It is important to note that the fixed points are not the solution to the problem. In general, it is not a single point. Instead, there is a continuum of fixed points associated with every solution. In order to determine the solution from the fixed points, we perform the Divide projection one more time as $y_{sol} = P_D(y^*)$.

Modeling Vision Problems as CSPs:

The D&C method can be used to solve several problems in geometric computer vision. In order to apply D&C, we first identify the constraints in the problem, and a method to enforce each constraint individually.

Conventional Line-Labeling Problem

Given a line drawing composed of line segments and junctions, our goal is to identify the junctions and label the line segments.

Figure 2A:
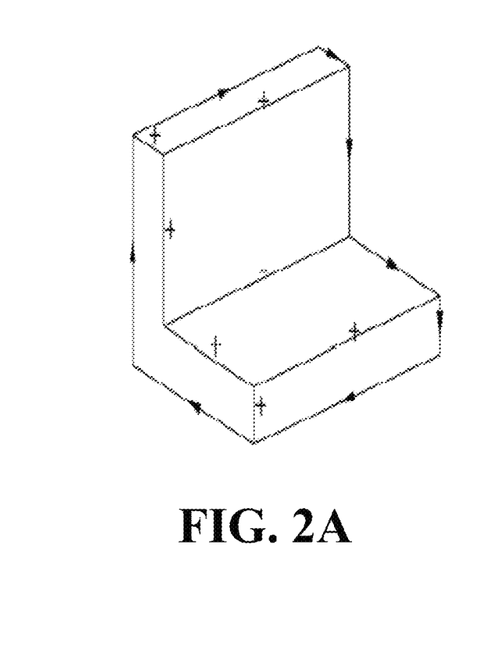
FIGS. 2A, 2B and 2C are line drawings with labels according to embodiments of the invention.
Figure 2B:
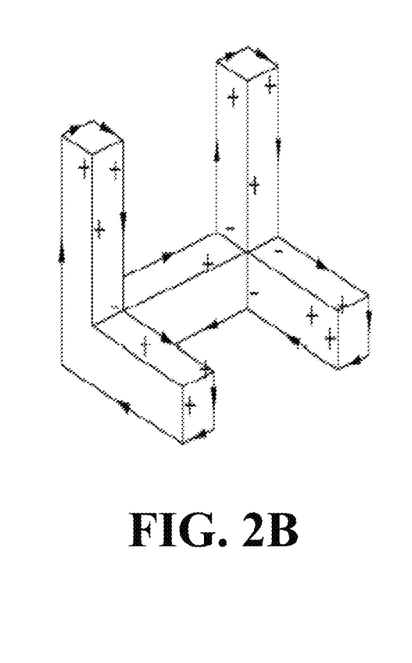
Figure 2C:
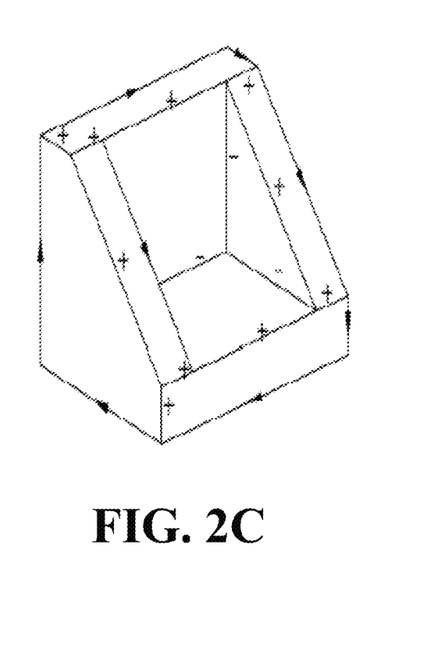
Figure 3A:
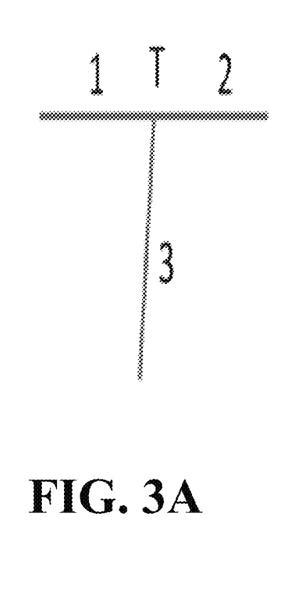
FIGS. 3A, 3B, 3C and 3D are schematics of T, W, Y and L labeled junctions according to embodiments of the invention.
Figures 3B, 3C:
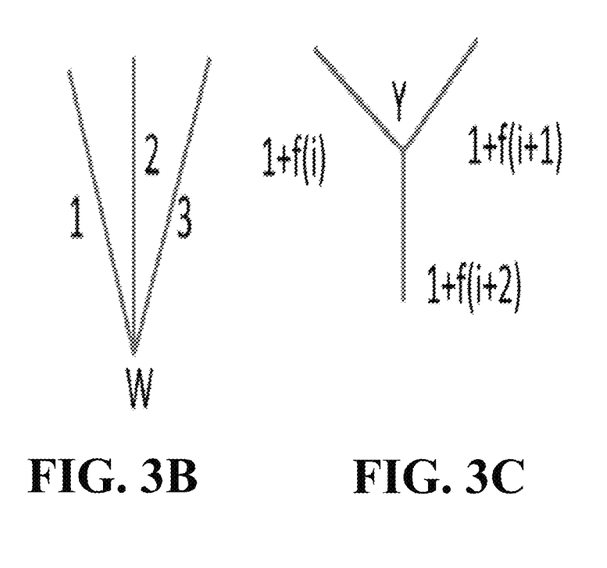
Figure 3D:
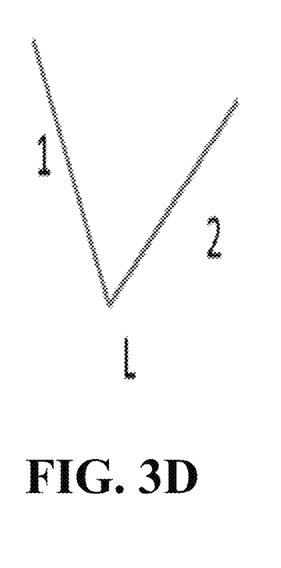

FIGS. 2A, 2B and 2C show schematic of line drawings with four labels (+, −, →, ←), where + and − represent convex (+), concave (−) line segments, and an occluding line segment with an arrow directed such that the occluding face is on the right and the occluded face is on the left (←,→). Each line segment in a line drawing corresponds to an edge between two faces in the three-dimensional object that the line drawing represents, or is a boundary between a face and the background.

Junction Types

Every junction is an intersection of two or more edges. The junction type can be inferred easily using the number and orientations of the edges incident to the junction. We assume that every junction type is identified prior to the labeling. We consider the following junctions L, Y, T, W, M, K, X for trihedral and tetrahedral objects. An object is trihedral if three faces meet at every junction. The object is an extended trihedral when exactly three planes meet at a point.

Junction Labeling

As shown in FIGS. 3A, 3B, 3C and 3D, the labeling of a junction denotes the label assignment for the edges in a specific order, which depends on the type of junction. The junctions T, W, Y and L are shown along with the ordering of edges incident to each one of the junctions. Here, f(i)= mod(i, 3).

There are only a few allowed labelings for every junction type depending on the type of object to which the junction belongs. We use four alphabets (a, b, c, d) to represent the labels. These alphabets are assigned to the edges based on the incident junction. If there is an occluding edge entering a junction, then it is assigned a label a. If there is an occluding edge leaving a junction, then it is assigned a label b. Thus, we have two labels for every edge depending on the two incident junctions. The alphabets c and d refer to convex(+) and concave(−) labels.

A junction catalog determines what possible labels the edges of a particular junction take. For example, a Y junction in a trihedral line drawing can only take the configurations ccc, ddd, abd, bda, and dab in the order defined in FIG. 2.

For every edge, we denote the label using a state vector: $(p_a\ p_b\ p_c\ p_d)$, where $p_a$, $p_b$, $p_c$ and $p_d$ are probabilities for the four possible labels and their sum is equal to 1. Let us consider a junction J with m incident edges. The junction state $x_t$ can be represented by a 4×m vector as $$x_t = (p1_a\ p1_b\ p1_c\ p1_d\ p2_a \cdots pm_d)^T. \quad (7)$$

Let us assume that a specific junction J has n different labelings in the junction catalog. Then, its junction catalog is given by the following matrix:

$$x_t \begin{pmatrix} 1 & 0 & \ldots & 0 \\ 0 & 0 & \ldots & 0 \\ 0 & 1 & \ldots & 0 \\ 1 & 0 & \ldots & 1 \\ \cdot & \cdot & \cdot & \cdot \end{pmatrix}_{4m \times n} \quad (8)$$

Note that the above matrix has only ones and zeros for the state probabilities.

Let $L = \{l_1, l_2, \ldots, l_n\}$ denote the columns of the above matrix. In the Divide projection, we have $P_D(x_t) = \text{argmin}_{l_i \in L} |x_t - l_i|$. For every edge, we have two different labelings from the overshoot operations on the two junctions.

Let $y_1^{over}$ and $y_2^{over}$ be the two replicas after overshooting as given by: $y_1^{over} = (p_a\ p_b\ p_c\ p_d)^T$, $y_2^{over} = (q_a\ q_b\ q_c\ q_d)^T$. Note that the labeling of a junction includes the states of all the edges incident on it. Thus $y_1^{over}$ and $y_2^{over}$ are the sub-vectors of the states of the two junctions corresponding to the chosen edge.

In the Concur projection, we average the two overshoots as $$P_C(y^{over}) = \left( \frac{p_a + q_a}{2}\ \frac{p_b + q_b}{2}\ \frac{p_c + q_c}{2}\ \frac{p_d + q_d}{2} \right)^T. \quad (9)$$

Because every edge is adjacent to two junctions, we have two replicas for every edge and the D&C method iterates until all junctions take valid labelings from the catalog and every edge is assigned the same label by both the adjacent junctions. The states of the edges change between integers and real values during Divide and Concur projections respectively.

Multi-View Geometry Problems

We list a few basic constraints that are sufficient to solve many computer vision problems. We write each of the constraint in the form $y = P(x,z)$, where x is the input variables, and y is the output obtained by moving x by a minimal distance to enforce the constraint. The term z refers to observed variables whose values can not be changed.

Rigidity $y = P_r(x,z)$: Given a set of 3D points x and a template set z, we move x to y so that y and z are related by a Euclidean transform.

Line constraint $y = P_l(x)$: Given a set of 3D points x, we determine y that lies on a line.

Plane constraint $y = P_\pi(x)$: Given a set of 3D points x, we determine y that lies on a plane.

Cheirality constraint $y = P_\chi(x)$: Given three points (origin, direction vector, and a particular point), we ensure that the point is in front of the origin with respect to the direction vector. We also ensure that this point is at least one unit from the origin.

Directed line $y = P_{dl}(x,z)$: Given a set of points x and a direction vector z, we determine y that lies on a line with direction z.

All these constraints can be enforced. For example, in order to enforce the plane constraint $y = P_\pi(x)$, we first fit a plane π to the points x using least-squares and then project all the points on to this plane π to obtain y.

We show schematic diagrams for four geometry problems in FIGS. 4-7. We solve each problem by considering a set of points to denote the scene and the camera. Next, we identify a few simple constraints such as line, plane and rigidity to provide an input for the D&C. We briefly describe each of these problems below.

n-View m-Point Perspective Case

Figure 4:
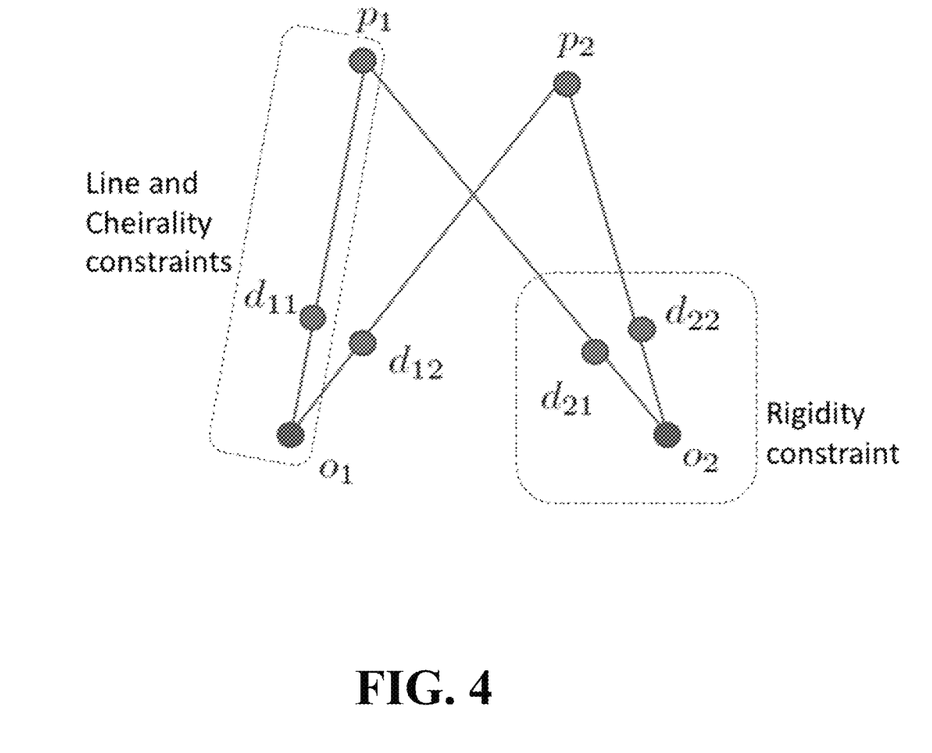
FIG. 4 schematically shows 3D reconstruction from multiple perspective images.
Figure 5:
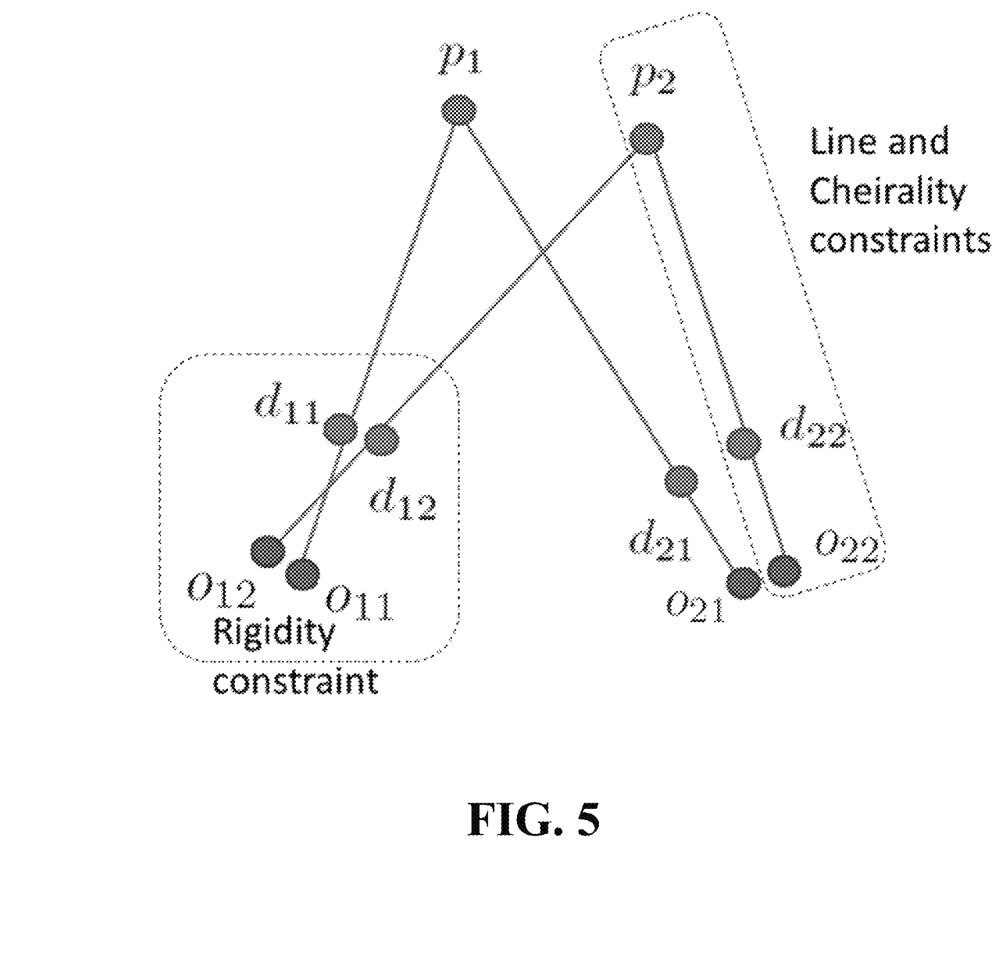
FIG. 5 schematically shows 3D reconstruction from multiple perspective images for general cameras.

In FIG. 4, we show the problem of 3D reconstruction from multiple perspective images. In order to solve the problem, we define the variables and the constraints. The two camera optical centers are denoted by $o_1$ and $o_2$ respectively. We consider 3D direction points $d_{ij}$ at unit distances from the camera optical centers. The 3D points are denoted by $P_1$ and $P_2$ respectively. In order to solve this problem, we consider several constraints that act on these variables. We enforce a line constraint on triplets of points consisting of the camera optical center, the direction point and the associated 3D point.

For example, $(o_1, d_{11}, p_1)$ can be one such triplet out of four. We enforce rigidity constraint for every camera. The ray directions and camera centers are rigid as per the camera calibration. During the iterations, the 3D points move around to satisfy the line constraints. We enforce rigidity constraints on the triplets $(o_1, d_{11}, d_{12})$ and $(o2_1, d_{21}, d_{22})$. The rigidity constraint allow this triplet to move around as a whole without allowing any changes in the inter-point distances among the pairs of points in the triplet.

On each projection ray, we enforce the Cheirality constraint that ensures that the 3D scene is reconstructed in front of the camera and also the points are at least 1 unit from the camera. The perspective reconstruction is always up to a scale. This constraint is necessary to avoid shrinking the scene to a single point.

n-View m-Point General Case

General cameras can be used to model a wide variety of camera models. In the general camera, the projection rays do not pass through a single point. Hence, we need two different 3D points to represent every ray. For example, in the first general camera in FIG. 5, we use $o_{11}$ and $d_{11}$ to denote a projection ray. The other constraints are similar to the ones used for perspective case. Note that there is no scale ambiguity in the case of general cameras.

n-View m-Line General Case

Given a set of line correspondences from different views of a general camera, our goal is to recover both the structure of the lines and the camera poses. In general, line-based triangulation is more challenging when compared to point-based ones. Here, we describe the problem of recovering 3D lines and camera poses for general cameras.

Figure 6:
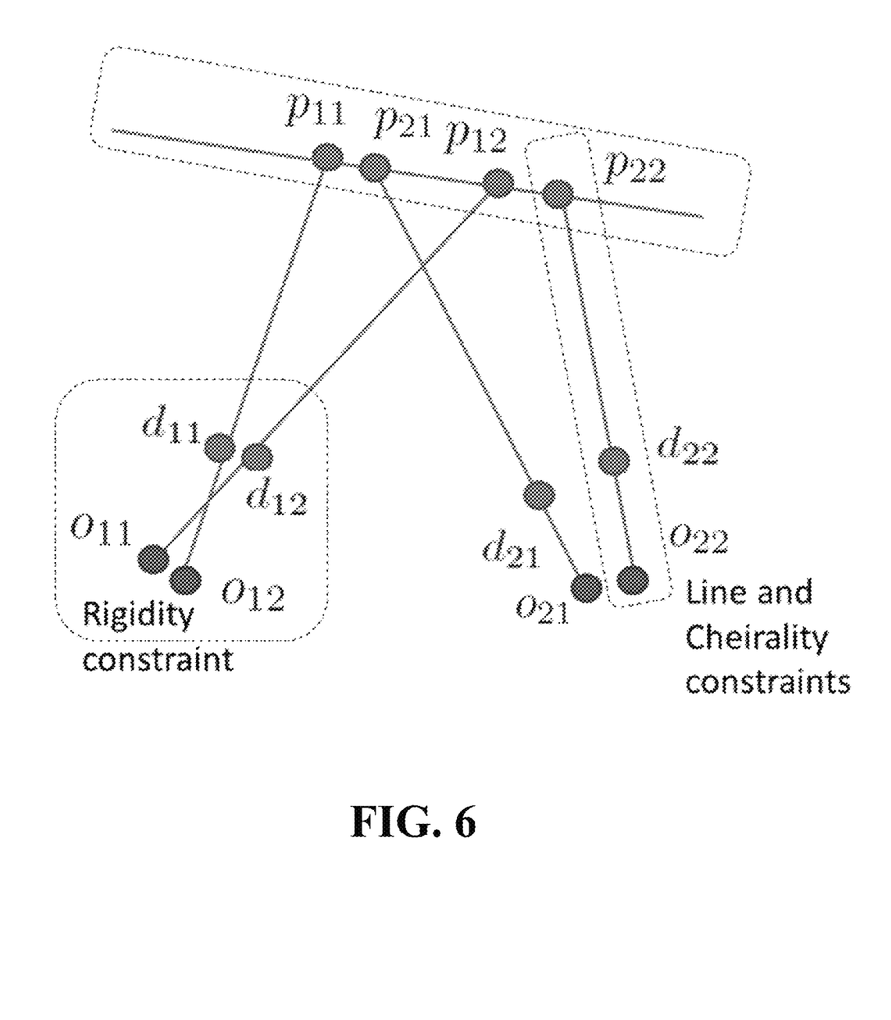
FIG. 6 schematically shows 3D reconstruction with Cheirality and rigidity constraints.

As shown in FIG. 6, in addition to the line through points $p_{i,j}$, Cheirality and rigidity constraints, we also use additional line constraints on the 3D scene line.

n-View m-Line Perspective Case with Geometric Constraints

Figure 7:
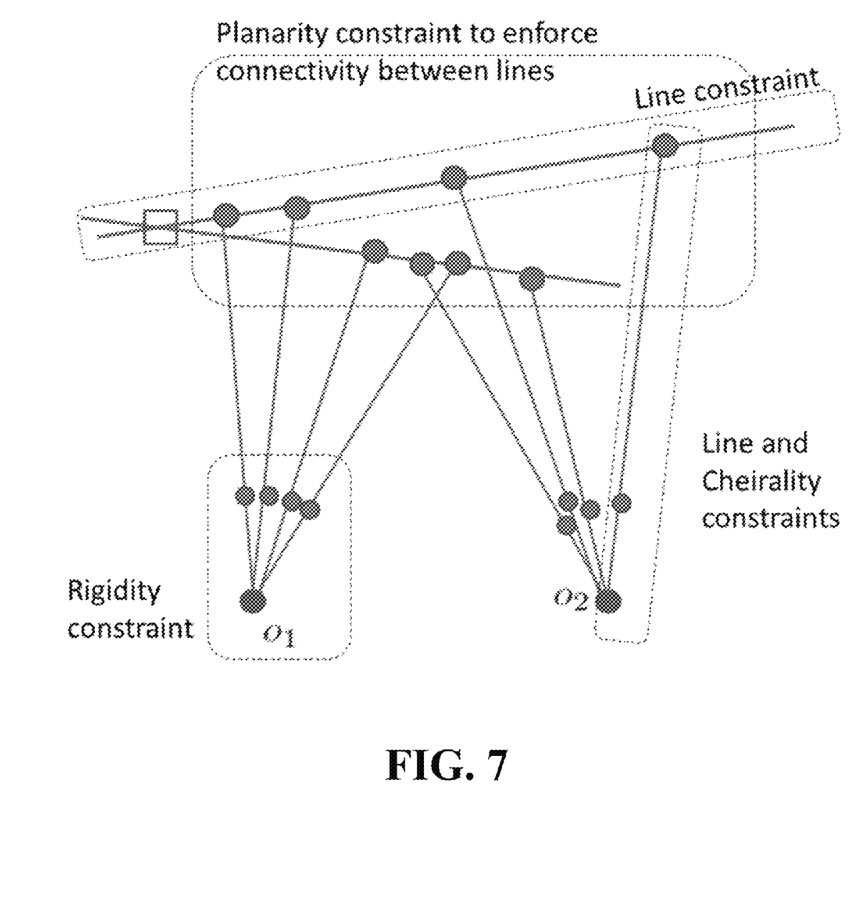
FIG. 7. schematically shows 3D reconstruction of lines from multiple images using plane constraints on points lying on intersecting lines.

Given a set of line correspondences, directions in the world, and connectivity constraints, we would like to recover the structure and poses of the cameras. As shown in FIG. 7, we use line constraint on the points lying on the 3D world line and plane constraints on the points coining from connected line segments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for reconstructing a scene as a three-dimensional (3D) model, comprising steps of:
    acquiring a sequence of images of the scene with a camera;
    using a processor configured for:
        extracting feature point matches or line matches from the acquired sequence of images of the scene;
        initializing variables for camera optical centers and 3D points using random values making n copies of the variables depending on an availability of n constraints, wherein n is a positive integer number;
        projecting the n copies by moving each copy of the n copies by a minimal distance to satisfy each constraint of the n constraints;
        replacing the projected n copies with averages of the projected n copies; and
        repeating the projecting and the replacing until convergence to provide the 3D model.

2. The method of claim 1, wherein the projecting and replacing uses difference-map dynamics.

3. The method of claim 2, wherein the difference-map dynamics includes the steps of:
    moving each copy of the n copies by twice an amount given by the projecting[32];
    replacing the projected n copies with averages of the projected n copies; and
    removing the amount from the replaced n copies, to obtain updated n copies for the next iteration.

4. The method of claim 1, wherein the constraints are rigidity, line, plane, cheirality and directed line constraints.

5. The method of claim 1, wherein the constraints are derived using the feature point matches or the line matches.

6. The method of claim 1, wherein the camera is a perspective camera where all camera projection rays pass through an optical center of the camera.

7. The method of claim 1, wherein the camera is a general camera where all camera projection rays need not pass through an optical center of the camera.

8. The method of claim 1, wherein the 3D model is achieved using the feature points matches or the feature lines matches.

9. The method of claim 1, wherein the three-dimensional (3D) model is reconstructed from multiple images of perspective cameras using Manhattan constraints and connectivity constraints.

10. The method of claim 1, wherein the sequence of images is acquired by a single moving camera or multiple stationary cameras.

11. A system for reconstructing a scene as a three-dimensional (3D) model, comprising:
    a camera configured to acquire a sequence of images of the scene; and
    a processor configured to implement the steps of:
        extract feature point matches or line matches from the acquired sequence of images of the scene;
        initialize variables for camera optical centers and 3D points using random values making n copies of the variables depending on an availability of n constraints, wherein n is a positive integer number;
        project the n copies by moving each copy of the n copies by a minimal distance to satisfy each constraint of the n constraints;
        replace the projected n copies with averages of the projected n copies; and
        repeat the projecting and the replacing until convergence to provide the 3D model.

12. The system of claim 11, wherein the projecting and replacing use difference-map dynamics.

13. The system of claim 12, wherein the difference-map dynamics includes the steps of:
    move each copy of the n copies by twice an amount given by the projecting[32];
    replace the projected n copies with averages of the projected n copies; and
    remove the amount from the replaced n copies, to obtain updated n copies for the next iteration.

14. The system of claim 11, wherein the camera is a perspective camera where all camera projection rays pass through an optical center of the camera.

15. The system of claim 11, wherein the camera is a general camera where all camera projection rays need not pass through an optical center of the camera.

* * * * *